Feb. 16, 1937.  A. MARCHEV ET AL  2,070,797
MULTIPLE ROLL DUPLICATING MACHINE
Filed May 11, 1934   8 Sheets-Sheet 1
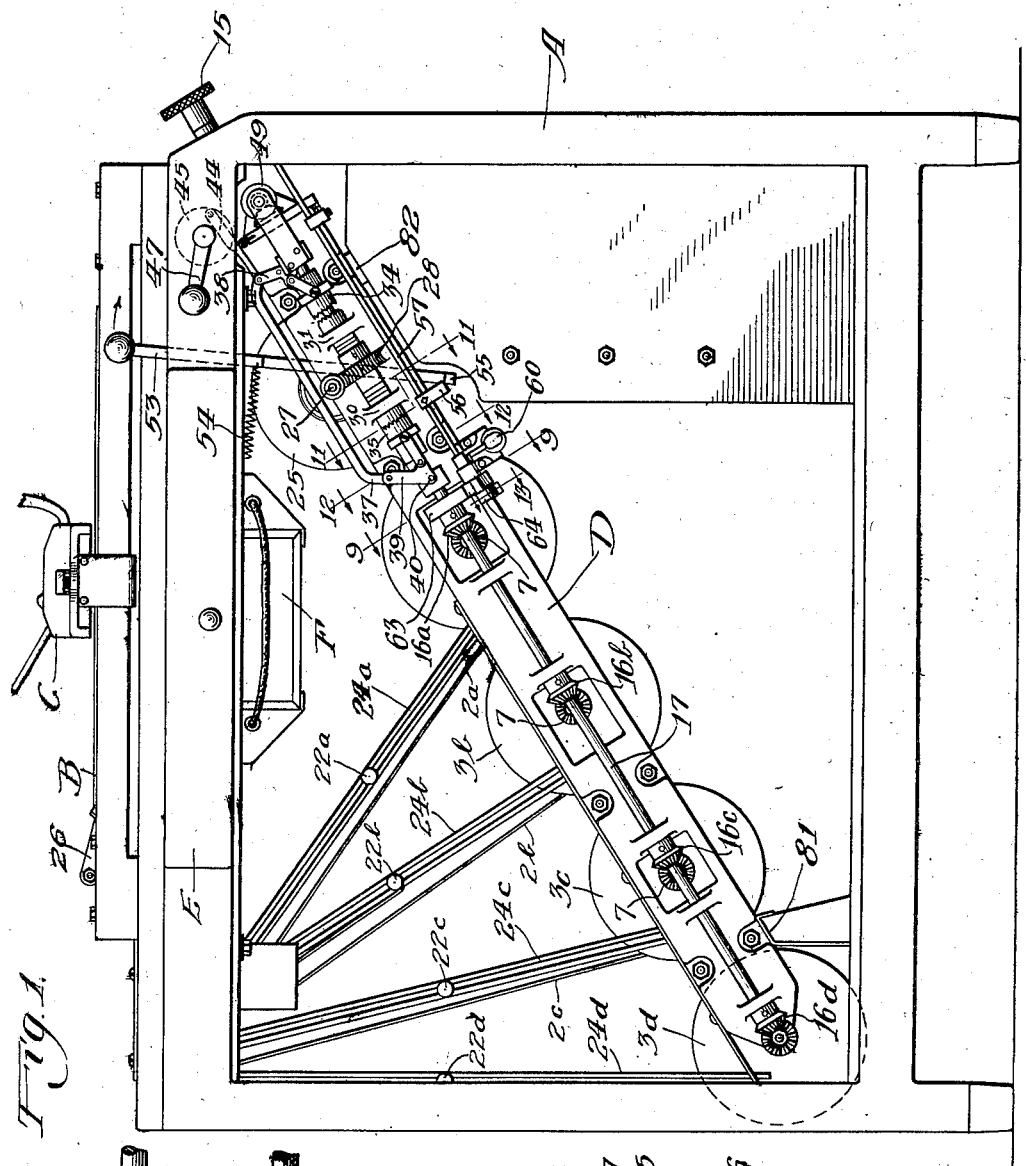

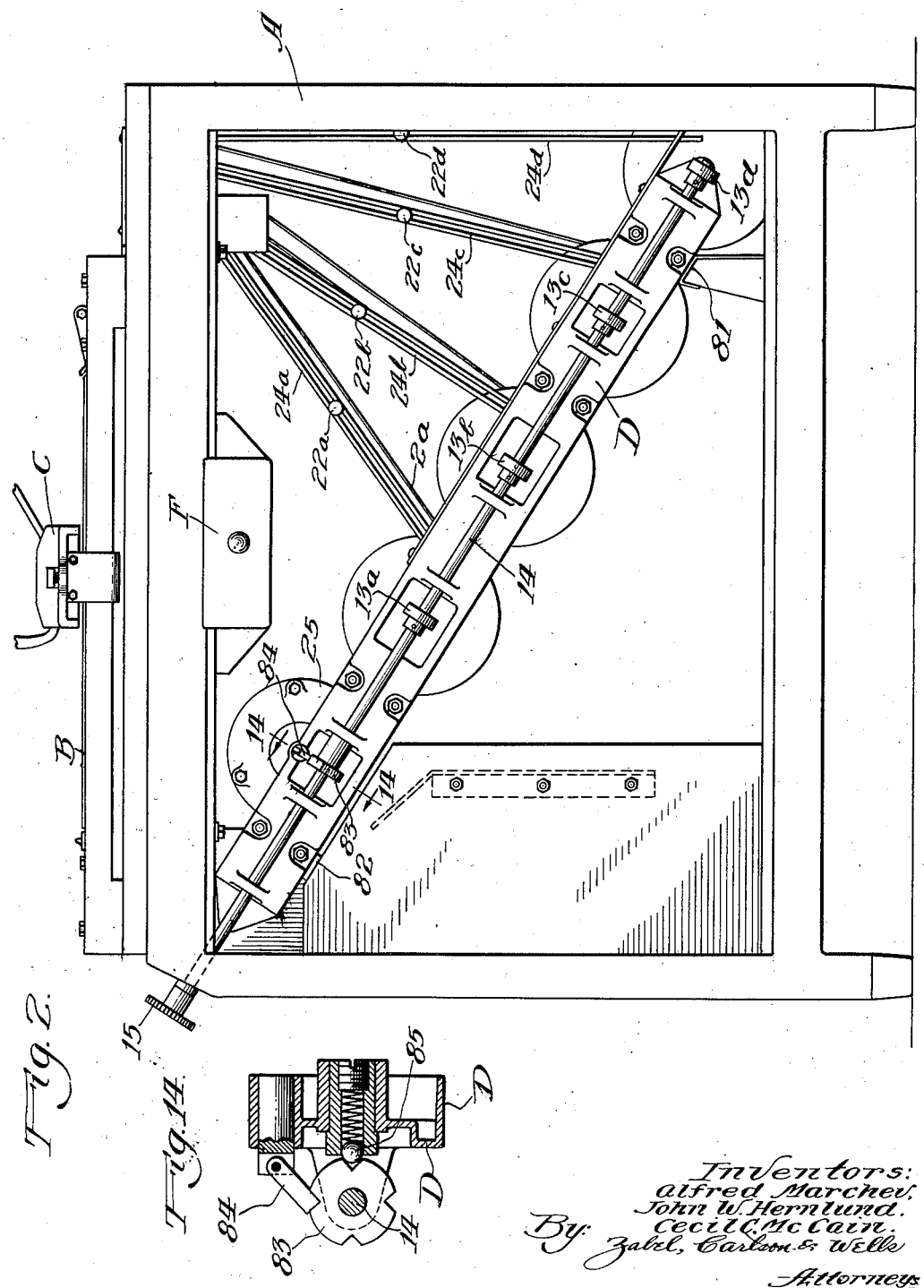

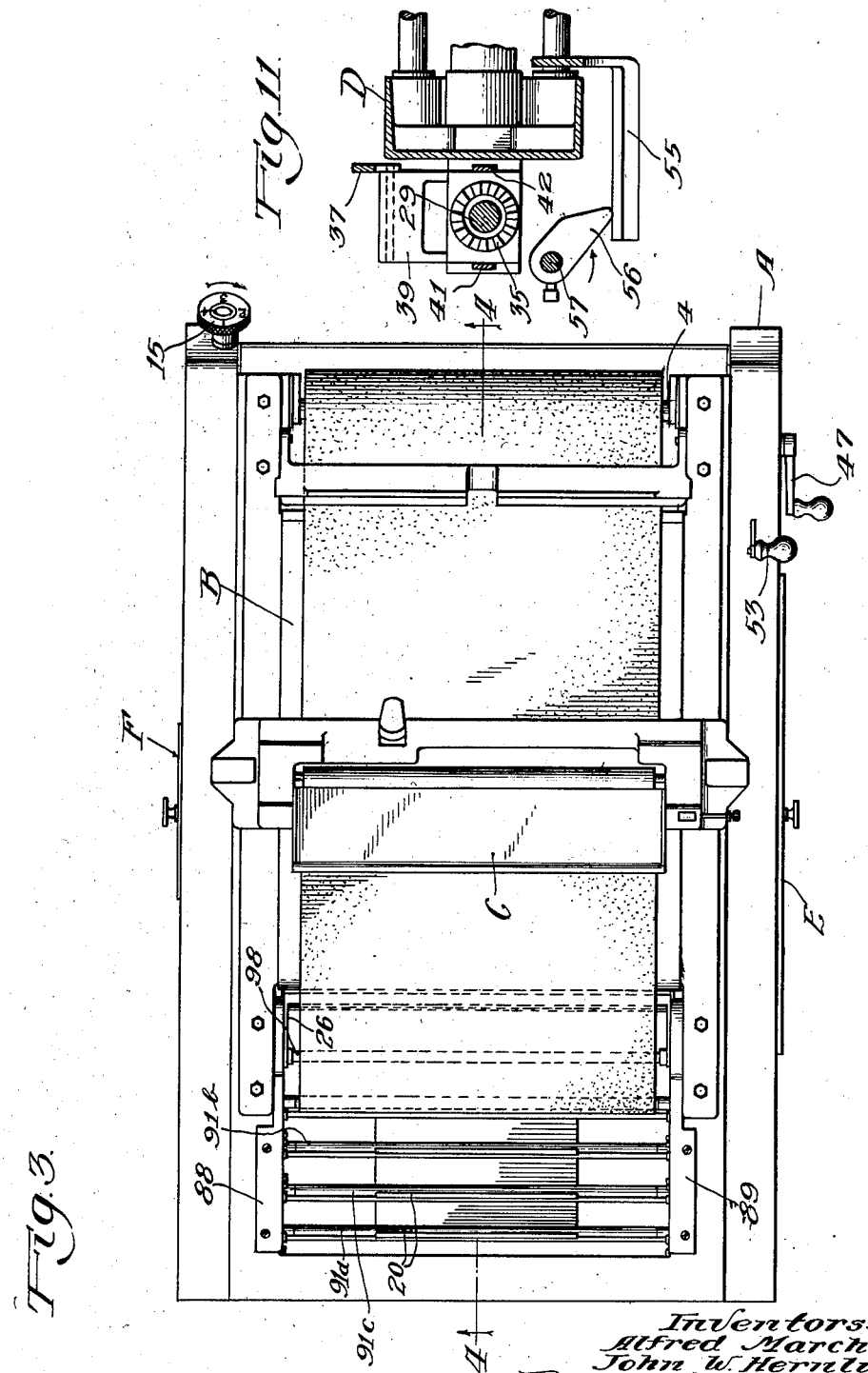

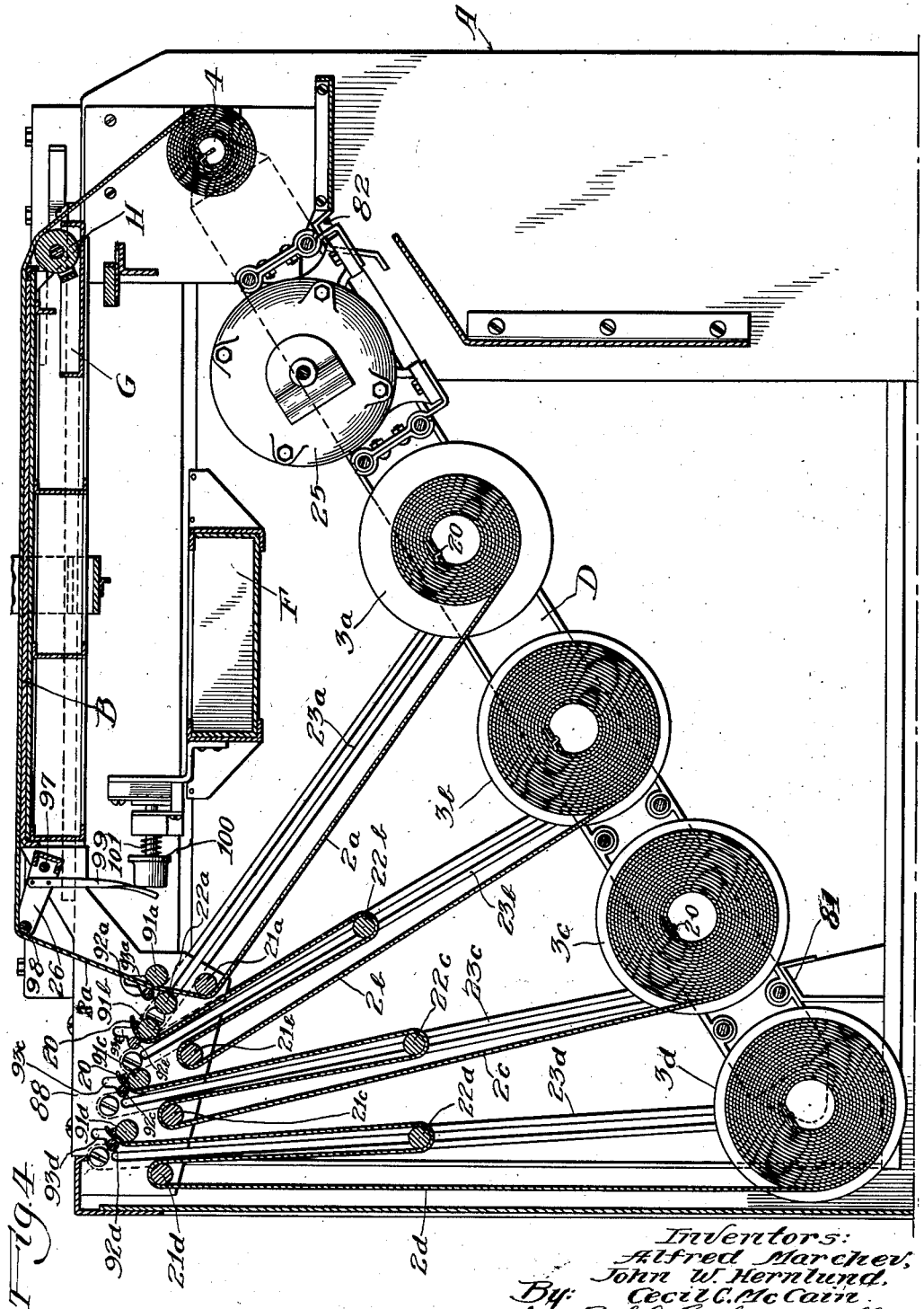

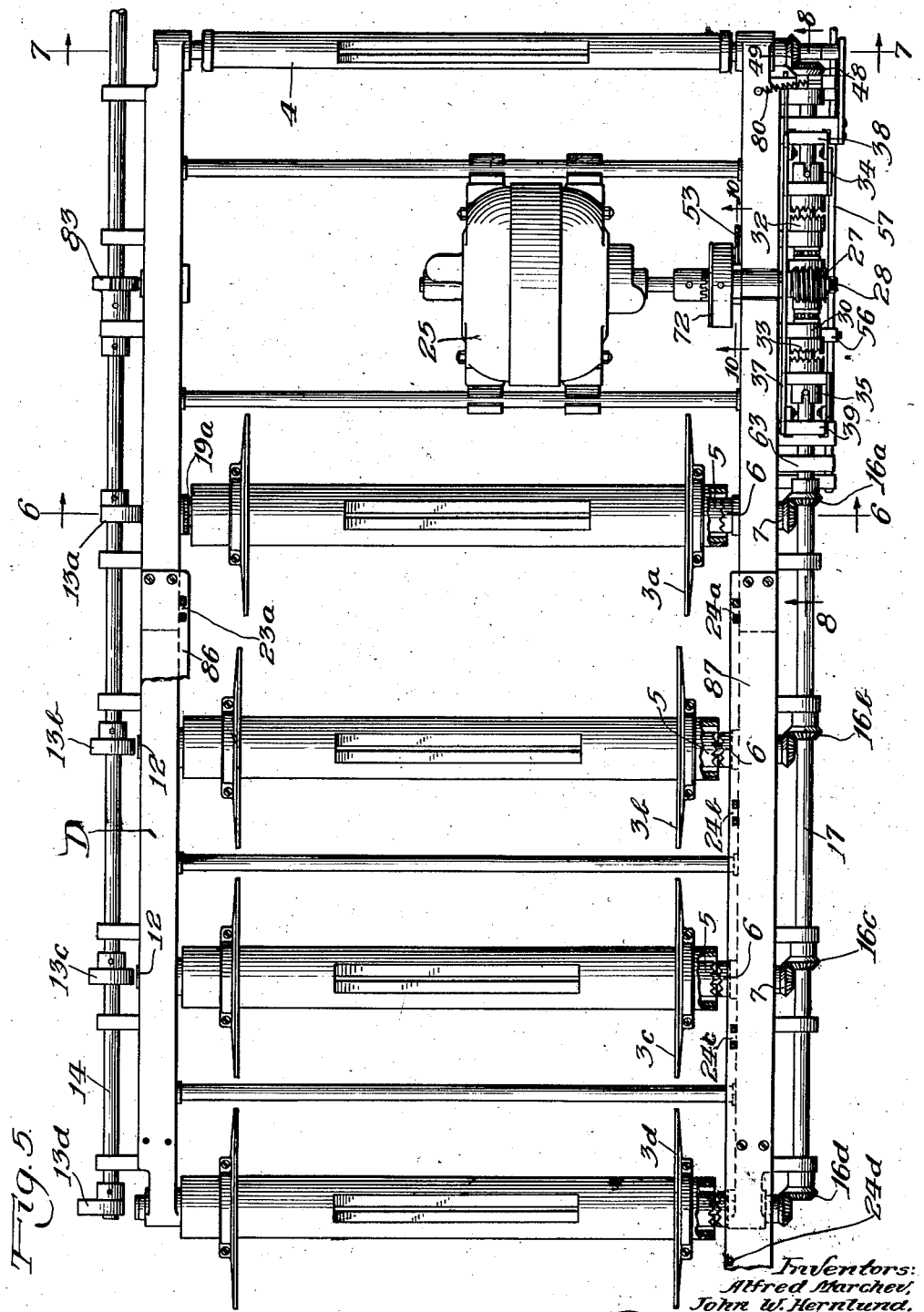

Feb. 16, 1937.   A. MARCHEV ET AL   2,070,797
MULTIPLE ROLL DUPLICATING MACHINE
Filed May 11, 1934   8 Sheets-Sheet 6
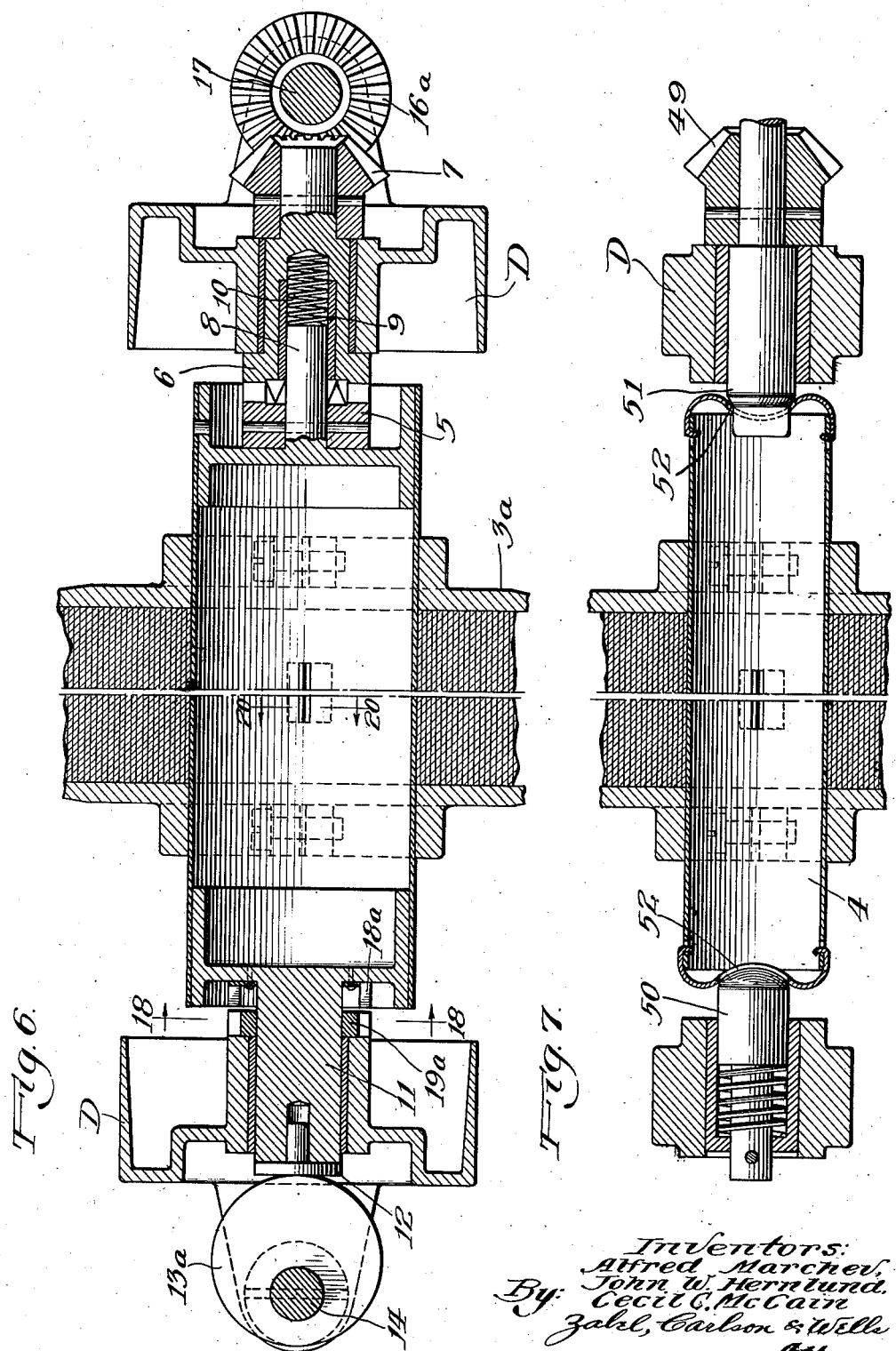
Inventors:
Alfred Marchev,
John W. Hernlund,
Cecil C. McCain
By Zabel, Carlson & Wells
Attorneys

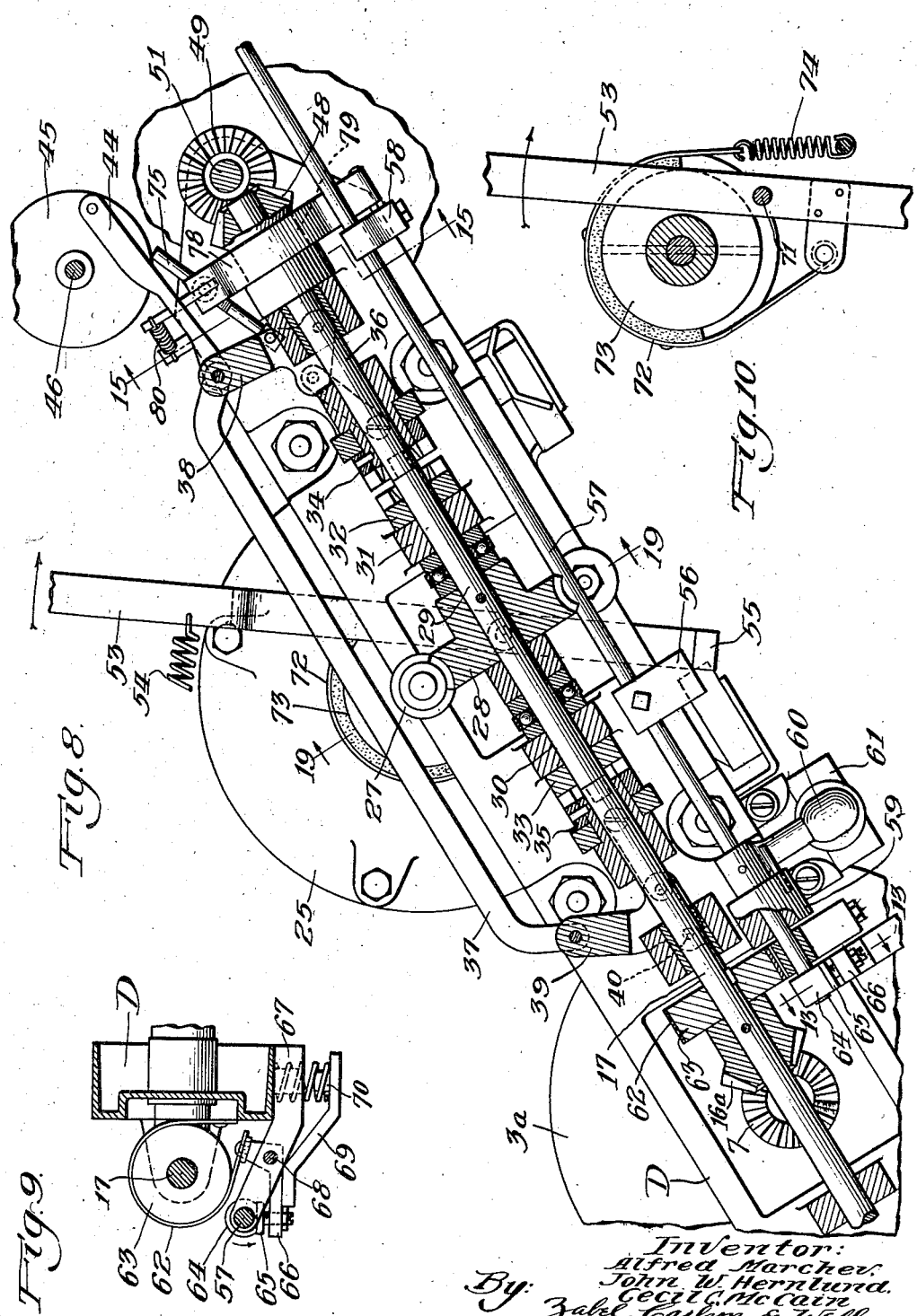

Feb. 16, 1937. A. MARCHEV ET AL 2,070,797
MULTIPLE ROLL DUPLICATING MACHINE
Filed May 11, 1934
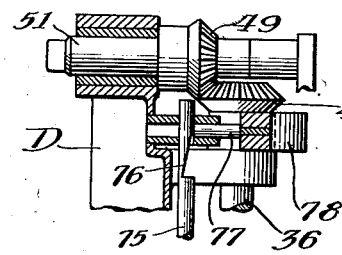
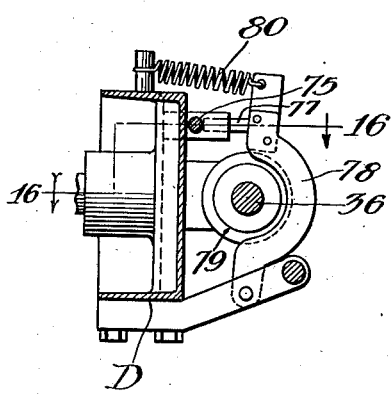
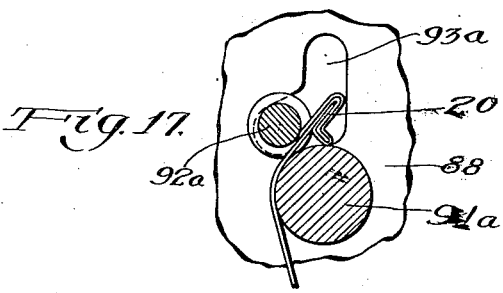
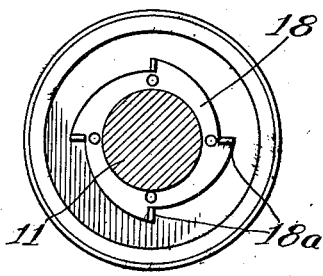
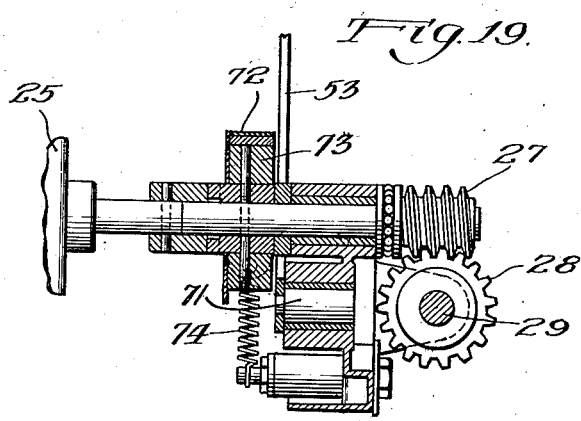
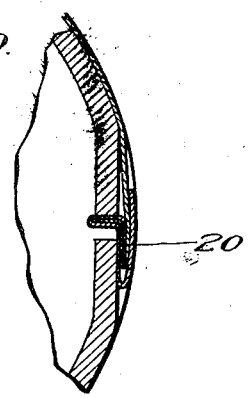
Inventors:
Alfred Marchev,
John W. Herntund,
Cecil C. McCain
By Zahel, Carlson & Wells
Attorneys Patented Feb. 16, 1937

2,070,797

UNITED STATES PATENT OFFICE 2,070,797

MULTIPLE ROLL DUPLICATING MACHINE

Alfred Marchev and John W. Hernlund, La Grange, and Cecil C. McCain, Glen Ellyn, Ill., assignors to Ditto, Incorporated, Chicago, Ill., a corporation of West Virginia Application May 11, 1934, Serial No. 725,036

13 Claims. (Cl. 242—55)

This invention relates to duplicating machines and is particularly adapted to be embodied in machines of the kind described which employ duplicating bands of the hectograph type.

The primary object of this invention is to provide improved means for handling the duplicating bands of duplicating machines.

Another object of the invention is to provide improved means whereby any one of a plurality of duplicating means may be brought into its operative position in a duplicating machine.

Another object of the invention is to provide improved means in a duplicating machine for storing a plurality of duplicating bands in such fashion that any one of them is ready to be selected and brought into functioning operative position in the machine.

Still another object of the invention is to provide an improved duplicating machine in which a plurality of duplicating bands are stored on spindles and may be unwound therefrom to draw them across the platen of the machine and to stretch them taut on the platen.

Other objects and advantages will become apparent as the description progresses, reference being had to the accompanying drawings wherein—

Fig. 1 is a side elevation of a duplicating machine which embodies the invention;

Fig. 2 is a side elevation of the machine showing the side opposite that shown in Fig. 1;

Fig. 3 is a plan view of the machine;

Fig. 4 is a section on the line 4—4 of Fig. 3;

Fig. 5 is a plan view partly in section of the spindle frame used for storing the bands;

Fig. 6 is a section taken on the line 6—6 of Fig. 5;

Fig. 7 is a section taken on the line 7—7 of Fig. 5;

Fig. 8 is a section taken on the line 8—8 of Fig. 5;

Fig. 9 is an enlarged detail section taken substantially on the line 9—9 of Fig. 1;

Fig. 10 is an enlarged section taken on the line 10—10 of Fig. 5;

Fig. 11 is an enlarged section taken on the line 11—11 of Fig. 1;

Fig. 12 is a similar section taken on the line 12—12 of Fig. 1;

Fig. 13 is a similar section taken on the line 13—13 of Fig. 1;

Fig. 14 is a section on the line 14—14 of Fig. 2;

Fig. 15 is a section on the line 15—15 of Fig. 8;

Fig. 16 is a section on the line 16—16 of Fig. 15;

Fig. 17 is an enlarged detail partly in section of the clip holding mechanism shown more generally in Fig. 4;

Fig. 18 is a section on the line 18—18 of Fig. 6;

Fig. 19 is a section on the line 19—19 of Fig. 8; and

Fig. 20 is a fragmentary view of a portion of the spindle showing the manner of securing the clip thereto.

Referring now to the drawings wherein a preferred embodiment of the invention is illustrated, A designates a stand. B designates the bed or platen mounted on the stand. C designates a carriage which is slidably mounted over the platen B and which is adapted to apply a sheet to be duplicated to a gelatin or duplicating band extending over the platen B.

The construction of the carriage C is well known to those skilled in this art, and, as its details do not form a part of this invention, they will not be illustrated or described.

Mounted within the stand A is a spindle supporting frame D. E designates a drawer in the side of the stand. F designates another drawer in the opposite side of the stand. Beneath the platen B there is provided a solution pan G (see Fig. 4) and a treating roller H for applying the solution to the gelatin or duplicating bands such as 2a, 2b, 2c, and 2d. The several bands just described are wound upon the spindles 3a, 3b, 3c, and 3d which are mounted in the spindle frame D. Also mounted in this frame is the receiving spindle 4 on which the gelatin bands are adapted to be wound as they are drawn from the spindles just described across the platen B.

The mounting of these spindles 3a, 3b, 3c, and 3d in the frame D is illustrated most clearly in Figs. 5 and 6 wherein each spindle is shown as having a clutch member 5 adapted to mesh with a similar clutch member 6 which is journaled in the frame and which carries the bevelled gear 7 at its outer end. The stud shaft 8 on the end of the spindle fits within the sleeve 9 of the clutch member 6, and the spring 10 yieldingly pushes the spindle to the left as shown in Fig. 6 to tend to open the clutch. At the opposite end of the spindle, the stud shaft 11 is journalled in the frame and carries a hardened pin 12 for engaging a cam member. There are four of these cam members 13a, 13b, 13c, and 13d, corresponding to the four spindles hereinbefore described, and these cam members are keyed to a shaft 14 and are spaced so as to be approximately ninety degrees apart around the shaft.

Thus, by rotation of the shaft 14 by means of the selector knob 15, either one of the cams 13a, 13b, 13c, or 13d can be caused to push its respective spindle to the right as shown in Fig. 6 and thus engage the clutch members 5 and 6 to connect that particular spindle to the bevel gear 7 and corresponding bevel gears 16a, 16b, 16c, and 16d to the shaft 17. When the spindles are not connected to the shaft 17, they are locked against movement by means of the interengaging members 18a, 18b, 18c, and 18d on the spindles and the members 19a, 19b, 19c, and 19d on the frame D. This is a safety device which prevents the operator from selecting one spindle and by mistake pulling the band on some spindle which has not been selected.

Each duplicating band has the usual clip such as 20 at its end, and, when the bands are wound on the spindles, they pass up over the guiding rolls such as 21a, 21b, 21c, and 21d, then beneath the floating rolls 22a, 22b, 22c, and 22d which rolls are free to slide up and down in the slots at the opposite sides of the frame which slots are shown most clearly at 23a, 23b, 23c, and 23d in Fig. 4. It is obvious that corresponding slots are formed on opposite sides of the frame as shown in Fig. 5 (see the slots indicated at 24a, 24b, 24c, and 24d). These rolls which I have termed floating rolls serve to pull the outer ends of the bands down after they have been released from the spindle 4 until the clips rest in the position indicated in Fig. 4. This is necessary because, as hereinafter described, the motor used in winding the bands back onto the storage spindles is shut off as soon as the bands are released from the spindle 4, so that they no longer are drawn down across the platen.

The particular trip mechanism for shutting off the motor 25 is shown most clearly in Fig. 4. In this figure, an arm 26 is shown as pivoted on the stand by means of the pin 97, and this arm carries the guide roll 98 over which the bands ride.

Now, when the bands are taut across the platen, they push this arm 26 down so that the depending lever 99 presses against the switch button 100 to close the motor circuit. This button 100 is spring pressed by means of the spring 101 to oppose the pressure of the lever 99 so that, as quick as the band is loosened so as not to press down on the roller 98, the spring 101 pushes the button out raising the arm 26 and opening the switch.

The driving mechanism for driving the various spindles to wind and unwind the bands thereon is mounted on the frame D. As best illustrated in Figs. 1, 5, and 8, the power is taken from the shaft of the motor 25 to a worm 27 and gear 28 to the shaft 29 which is journalled in the bearings 30 and 31 on the frame D. This shaft 29 has at the upper end thereof the clutch member 32 and at the lower end thereof a similar clutch member 33. The clutch member 32 cooperates with the clutch member 34 to connect shaft 29 to shaft 36 which abuts shaft 29, but which is free to rotate with respect thereto when the clutch members 32 and 34 are not in engagement. Clutch member 33 cooperates with a clutch member 35 on shaft 17 which is also journalled in the frame D and which carries the bevel gears 16a, 16b, 16c, and 16d for operating these several spindles 3a, 3b, 3c, and 3d. Clutch members 34 and 35 are connected to an operating link 37.

This link 37 connects to yoke 38 at one end and to yoke 39 at the other end. These yokes are pivoted to the frame as indicated for example at 40 and are connected by means of links such as 41 and 42 to their respective clutch members. That is, yoke 38 is connected to clutch member 34, and yoke 39 is connected to clutch member 35. From an examination of Fig. 8, it is evident that the two yokes are moved in unison so that, when clutch member 34 is moved away from clutch member 32, clutch members 33 and 35 are meshed together. The link 37 is connected by means of link 44 to the crank 45 on shaft 46, and this shaft is mounted in the stand and has the operating handle 47 projecting out at one side of the stand.

By moving the handle 47 into the position shown in Fig. 1, for example, the shaft 29 is connected by means of the clutch members 33 and 35 to shaft 17 and through the bevel gears on this shaft, and on the spindle shafts power may be connected to any one of the spindles 3a, 3b, 3c, or 3d to wind the duplicating band thereon.

In winding the duplicating band on spindle 4, the handle 47 is turned in a clockwise direction from the position shown in Fig. 1 to move the links 44 and 37 out of the position shown in Figs. 1 and 8 and to the right as shown in Fig. 8 thus to open the clutch members 33 and 35 and to connect the clutch members 32 and 34, thereby connecting shaft 29 with shaft 36 which has the bevel gear 48 meshing with the bevel gear 49 that drives the spindle 4.

The mounting of spindle 4 is shown clearly in Fig. 7 where it is shown as mounted between the spring pressed pin 50 and the driving pin 51, the driving pin 51 having a flattened end which fits in a slot 52 in the end of the spindle.

Now in winding the bands from a spindle such as 3a over the platen bed, the operator grasps the clip 20 of the selected band after having operated the selector knob 15 and draws the band across the platen and hooks the clip onto the spindle 4 in the manner shown for example in Fig. 20. After that, the handle 47 is set in winding position, and the power lever 53 is pulled in the direction of the arrow shown in Fig. 1 against the tension of its spring 54. Lever 53 is pivoted on the frame D as indicated at 71 (see Figs. 10 and 19) so that the foot 55 on the lever swings up toward the frame when the lever is pulled in the direction of the arrow (Fig. 1). This causes the foot 55 of the power lever to engage the arm 56 which is mounted on the control shaft 57 (see Figs. 1, 8, and 11), and arm 56 is thus moved by foot 55 to turn control shaft 57. This control shaft is mounted in suitable bearings such as 58 and 59 carried by the frame D.

The turning of the control shaft 57 accomplishes several results. This shaft operates the switch lever 60 to cause it to close switch 61 and to energize the motor. Power is then fed from the motor through the worm 27 and gear 28 to shaft 29 and through the clutch members 32 and 34 and shaft 36 to the gears 48 and 49 to drive spindle 4 and to start winding the band on this spindle drawing it across the platen.

This turning of shaft 57 operates also to release the brake band 62 riding on the brake drum 63 on shaft 17 (see Fig. 9). That is to say, the rocking of the shaft 57 in the direction of the arrow shown in Fig. 9, which is accomplished by the operator pulling on the lever 53, turns the little flat side cam member 64 from the position shown in Fig. 9 to that shown in Fig. 13 thus to depress the screw 65 and with it the free end of the member 66 to which the brake band is attached and thus loosen the brake. The crank arm 66 is pivoted by means of the pin 68 on the bracket 67 carried by the frame D. Crank arm 66 also carries the extension 69 which is pushed down by means of the spring 70 mounted between it and the frame D as shown most clearly in Fig. 9. Thus the spring 70 tends to force the free end of the crank arm 66 up to keep the head of the adjusting screw 65 against the little cam member 64.

Releasing of the brake on shaft 17 allows it to turn so that the band can be drawn off the selected spindle. The operation of the lever 53, which is pivoted to the frame as indicated at 71, also releases the brake band 72 around the drum 73 mounted on the motor shaft. In practice, the brake bands 62 and 72 are preferably released before the switch lever 60 closes the motor circuit by operating the switch 61.

After the band has been drawn across the platen to the desired point, it is necessary to stretch it taut on the platen, and to do this the lever 53 is reversed releasing the shaft 57 from the pressure exerted thereon by the portion 55 of the lever 53 bearing on the member 56.

The immediate effect of this action is to cut off the motor current because switch 61 is opened owing to the spring pressure forcing the lever 60 outwardly and this lets the little cam 64 return to the position shown in Fig. 9, causing the brake band 62 to draw tight under the influence of the spring 70 and thus quickly stop the shaft 17, stopping the spindle which has been selected from further rotation.

The momentum of the motor and the driving mechanism connecting it to the spindle 4 carries the spindle 4 a little farther and thus tightens the band on the platen before the brake band 72 can completely stop the motor. The amount of pressure exerted by the band 72 on the motor shaft drum 73 determines the amount of tightening that will be caused by the momentum of the motor after it has been shut off. The spring 74 connected to the brake band 72 is so adjusted as to permit the right amount of overrunning of the motor to stretch the band properly over the platen. When it is necessary to feed a further amount of the band over the platen to get a new surface, the lever 53 is again actuated as before to feed more of the band over onto the spindle 4, and the band is stretched taut after this has been accomplished, in the same fashion as just described.

Now when the band is to be rewound upon the selected spindle such as 3a, 3b, 3c, or 3d, the handle 47 is shifted back to the reverse position shown in full lines in Fig. 1. This action, through the crank 45 and links 44 and 37, yokes 38 and 39, their associated clutch members 34 and 35, disconnects shaft 29 from shaft 36 and connects shaft 29 to shaft 17, brake bands 72 and 62 remaining tight as they are always left when the motor is shut off. This shifting connects the power through shaft 17 and its associated bevel gears 16a, 16b, 16c, and 16d to the bevel gears 7a, 7b, 7c, and 7d and to the associated clutch members 6a, 6b, 6c, and 6d. Of all these clutch members, however, only the selected one is in engagement with its corresponding clutch member 5 on the spindle, the other spindles being freed by the springs such as 10 from their clutch members such as 6a and locked against movement by the members such as 18a and 19a.

The shifting of the lever 47 into reverse position also applies a brake to the shaft 36 to provide a drag on the spindle 4 and prevent its rotating too fast during the rewinding operation. This brake mechanism will be understood most fully by reference to Figs. 8, 15, and 16.

It will be noted that there is a pin 75 connected to the yoke 38 which pin is notched as indicated at 76 (see Fig. 16) so that, when the yoke 38 is moved into the position shown in Fig. 8, this notch is moved beneath the pin 77 carried by the brake arm 78 which engages the small brake drum 79 on shaft 36. Moving the notch 76 under the pin 77 allows the brake arm 78 to move, under the influence of spring 80, against the drum 79 to thus apply a drag or braking action to the shaft 36 which is communicated to the spindle 4 through the bevel gears 48 and 49.

The rewinding operation will continue until the band is completely removed from the spindle 4. The clip 20 at the end of the band is readily pulled off at the end of the winding without stopping the rewinding operation, and, when this occurs, the tension on the band where it crosses over the platen is released. This permits the arm 26 to rise as spring 101 pushes out on the switch button 100, and this cuts off the supply of current to the motor in case the operator should fail to open the motor circuit by releasing the lever 53. As soon as the motor is stopped, the selected spindle is stopped, and the band is drawn down into the position shown in Fig. 4 for bands 2b, 2c, and 2d by the weight of the roller such as 22b. This ends the rewinding operation and leaves the band wound on its storage spindle and moistened by the solution which was applied by the roller H during the rewinding operation.

The duplicating bands stored on the spindles thus may be used as desired and left standing when not in use so as to be automatically reconditioned on the spindles. The bands on the several spindles may be of different widths for different types of work if desired, and the length may be any length which is best suited for the machine.

It will be observed that all of the roll operating mechanism is carried by the frame d which is mounted on the stand A on suitable brackets as indicated at 81 and 82. This makes it possible to remove and replace the entire band winding mechanism with little difficulty.

The cam operating shaft 14 is provided with means, shown most clearly in Figs. 2 and 14, to retain it in any selected position. This means consists of the notched disk 83 secured on the shaft latching pawl 84 for limiting the direction of rotation to one direction, and the spring pressed ball 85 cooperating with the notches in the disk 83 to yieldingly hold the shaft in any one of four selected positions. The pawl 84 and the pawl 85 are carried by the frame D as shown clearly in Fig. 14.

The members forming the guide slots 23a, 23b, 23c, and 23d, and 24a, 24b, 24c, and 24d are secured at their lower ends to the frame member D by the plates 86 and 87 (see Fig. 5) so that they may be readily detached; and at the top, these members are secured to the plates 88 and 89 which also carry the rolls 21a, 21b, 21c, and 21d and rolls 91a, 91b, 91c, and 91d. The loose rolls 92a, 92b, 92c, and 92d are carried in the slots 93a, 93b, 93c, and 93d so that these loose rolls such as 92a may be lifted up in the slots to permit the clips 20 to be removed from between rolls 91 and 92. (See, for a clear illustration of this structure, the fragmentary view in Fig. 17.)

The improved means for handling the duplicating bands in a machine of the type described is advantageous as it permits the operator to wind and rewind and quickly stretch the bands over the platen and to quickly change from one band to another.

The particular construction shown is also advantageous in that it does not require the operator to handle the rolls of duplicating band when one duplicating band is substituted for another, and it permits the use of bands of different widths in a single machine with no change in the structure or the operation.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as possible in view of the prior art.

Having thus described our invention, what we claim as new and desire to secure by Letters Patent is:

1. In a duplicating machine, a stand, a platen thereon, a framework carried by said stand and a plurality of storage spindles journalled in fixed positions in said framework, a drive shaft, a winding spindle adapted to be driven from said shaft, duplicating bands on said storage spindles adapted to be drawn over the platen and secured to the winding spindle, means to rotate said drive shaft and winding spindle to transfer the band from a storage spindle to the winding spindle, and mechanism stretching said band taut across the platen upon stopping the drive shaft.

2. In a duplicating machine, a stand, a platen thereon, a framework carried by said stand and a plurality of storage spindles journalled in fixed positions in said framework, a drive shaft, a winding spindle adapted to be driven from said shaft, duplicating bands on said storage spindles adapted to be drawn over the platen and secured to the winding spindle, means to rotate said drive shaft and winding spindle to transfer the band from a storage spindle to the winding spindle, and mechanism stretching said band taut across the platen upon stopping the drive shaft, a rewinding shaft, means to connect said rewinding shaft to any storage spindle, and clutch means to connect the drive shaft to the rewinding shaft.

3. In a duplicating machine, a stand, a platen mounted on said stand, a spindle framework beneath said platen, a plurality of storage spindles journalled in fixed positions on said framework, a duplicating band wound around each storage spindle, a winding spindle mounted on said framework, the outer ends of said bands being adapted to be drawn over the platen and secured to said winding spindle with the storage spindles remaining in fixed position, a drive member, means to connect said drive member to any one of said spindles for winding the band thereon, and means to automatically stop said drive shaft upon release of the band across the platen.

4. In a duplicating machine, a stand, a platen mounted on said stand, a spindle framework beneath said platen, a plurality of storage spindles journalled in fixed positions on said framework, a duplicating band wound around each storage spindle, a winding spindle mounted on said framework, the outer ends of said bands being adapted to be drawn over the platen and secured to said winding spindle with the storage spindles remaining in fixed position, a drive member, means to connect said drive member to any one of said spindles for winding the band thereon, and means to automatically stop said drive shaft upon release of the band across the platen, said last named means including a trip arm held down by the band while it is drawn across the platen.

5. In a duplicating machine, a stand, a platen mounted on said stand, a spindle framework beneath said platen, a plurality of storage spindles journalled in fixed positions on said framework, a duplicating band wound around each storage spindle, a winding spindle mounted on said framework, the outer ends of said bands being adapted to be drawn over the platen and secured to said winding spindle with the storage spindles remaining in fixed position, a drive member, and selecting means to select the desired storage spindle for rotation by the drive member comprising a selecting shaft, a cam member thereon for each storage spindle, clutch means for each spindle actuated by the respective cam members for establishing driving connection for the spindles.

6. In a duplicating machine, a stand, a platen mounted on said stand, a spindle framework beneath said platen, a plurality of storage spindles journalled in fixed positions on said framework, a duplicating band wound around each storage spindle, a winding spindle mounted on said framework, the outer ends of said bands being adapted to be drawn over the platen and secured to said winding spindle with the storage spindles remaining in fixed position, a drive member, and selecting means to select the desired storage spindle for rotation by the drive member comprising a selecting shaft, a cam member thereon for each storage spindle, clutch means for each spindle actuated by the respective cam members for establishing driving connection for the spindles, and locking means for each spindle released by the respective cam member for locking each spindle against rotation except when selected.

7. In a duplicating machine, a stand, a platen mounted on said stand, a spindle framework beneath said platen, a plurality of storage spindles journalled in fixed positions on said framework, a duplicating band wound around each storage spindle, a winding spindle mounted on said framework, the outer ends of said bands being adapted to be drawn over the platen and secured to said winding spindle with the storage spindles remaining in fixed position, guide rolls for said bands above the storage spindles, one of said guide rolls for each band being free to move up and down, and the band passing beneath it whereby, when the end of a band is released from the winding spindle, the free roll will draw it off the platen.

8. In a duplicating machine, a stand, a platen mounted on said stand, a spindle framework beneath said platen, a plurality of storage spindles journalled in fixed positions on said framework, a duplicating band wound around each storage spindle, a winding spindle mounted on said framework, the outer ends of said bands being adapted to be drawn over the platen and secured to said winding spindle with the storage spindles remaining in fixed position, a drive member, and means to connect said drive member to any one of said spindles for winding the band thereon, and brake mechanism for said winding spindle controlled by said correcting means for applying a retarding effect thereto when the band is being transferred from it to a storage spindle.

9. In a duplicating machine, a stand, a platen mounted on said stand, a spindle framework beneath said platen, a plurality of storage spindles journalled in fixed positions on said framework, a duplicating band wound around each storage spindle, a winding spindle mounted on said framework, the outer ends of said bands being adapted to be drawn over the platen and secured to said winding spindle with the storage spindles remaining in fixed position, a drive member, and means to connect said drive member to any one of said spindles for winding the band thereon, said means including a drive shaft, a winding shaft, a rewinding shaft, mechanism for connecting the rewinding shaft to any one of said storage spindles, and clutch means for connecting the drive shaft to either the winding shaft or the rewinding shaft, brake means for each of said shafts operable to leave the band taut across the platen when the drive shaft is stopped during the winding operation.

10. In a duplicating machine, a stand, a platen mounted on said stand, a spindle framework beneath said platen, a plurality of storage spindles journalled in fixed positions on said framework, a duplicating band wound around each storage spindle, a winding spindle mounted on said framework, the outer ends of said bands being adapted to be drawn over the platen and secured to said winding spindle with the storage spindles remaining in fixed position, a motor on said framework, means to connect said motor to any selected storage spindle to wind a band thereon, means to connect said motor to the winding spindle to wind a band thereon from a storage spindle, a brake for said winding spindle, and control means operable to apply the brake to the winding spindle when the motor is connected to a storage spindle.

11. In a duplicating machine, a stand, a platen mounted on said stand, a spindle framework beneath said platen, said framework having a drive means and a plurality of storage spindles journalled thereon, duplicating bands on said spindles, means actuated by said drive means for drawing a band from one of said spindles across said platen, clips on the bands for securing the bands to said means, and means above said spindles at one end of the platen for holding the several clips when they are released from said last named means, said holding means comprising guide rollers, one of which is manually shiftable with respect to the other to pass the clip therebetween.

12. In a duplicating machine, a stand, a platen mounted on said stand, a spindle framework beneath said platen, said framework having a drive means and a plurality of storage spindles journalled thereon, duplicating bands on said spindles, means actuated by said drive means for drawing a band from one of said spindles across said platen, clips on the bands for securing the bands to said means, and means above said spindles at one end of the platen for holding the several clips when they are released from said last named means, said holding means comprising guide rollers, one of which is manually shiftable with respect to the other to pass the clip therebetween, and a third roller movable with respect to the first two and supported by the band.

13. In a duplicating machine, a stand, a platen mounted on said stand, a spindle framework beneath said platen, said framework having a drive means and a plurality of storage spindles journalled thereon, duplicating bands on said spindles, means actuated by said drive means for drawing a band from one of said spindles across said platen, said drawing means being also on the framework and the framework with the aforementioned spindles and means being removable from the stand as a unit.

ALFRED MARCHEV.
JOHN W. HERNLUND.
CECIL C. McCAIN.